Jan. 12, 1926.

S. WÖHRLE 1,569,797

TEMPERATURE CONTROLLING SYSTEM FOR RAILWAY CARS

Filed Nov. 1, 1921    2 Sheets-Sheet 2

Inventor:

Silvester Wöhrle
by
Leo J. Matty att'y

Patented Jan. 12, 1926.

1,569,797

UNITED STATES PATENT OFFICE.

SILVESTER WÖHRLE, OF STEGLITZ, NEAR BERLIN, GERMANY, ASSIGNOR TO THE FIRM OF OPTISCHE ANSTALT C. P. GOERZ AKTIENGESELLSCHAFT, OF FRIEDENAU, NEAR BERLIN, GERMANY.

TEMPERATURE-CONTROLLING SYSTEM FOR RAILWAY CARS.

Application filed November 1, 1921. Serial No. 512,130.

*To all whom it may concern:*

Be it known that I, SILVESTER WÖHRLE, a citizen of the German Republic, and resident of Steglitz, near Berlin, Germany, have invented certain new and useful Improvements in and Relating to Temperature-Controlling Systems for Railway Cars, of which the following is a specification.

For the transportation of easily damageable objects such as meat, fish, fruit and other provisions which must be cooled by ice or other cooling means in order to avoid deterioration, it is important to control the temperature of the railway cars, wherein the objects are stored. It must be possible to control the temperature on the stations of the train conveniently from outside the cars, and the temperature recording device must be so constructed as to allow rough handling by railway attendants. This invention relates to a system of temperature control in railway cars which fulfils these requirements.

The temperature control requires the arrangement of a temperature recording device within the railway car which continuously registers on a suitable writing surface the temperature within the car. In such temperature recording devices it is usual to employ as recording surface sheets of paper which are mounted on a rotatable drum actuated by a clock work. According to this invention the registering device is likewise provided with a rotatable drum for carrying the recording sheet, however, in order to allow continuous registration for a long period such as for weeks, the drum is given a great diameter surpassing of the height of the drum which is made comparatively small in view of the fact that no great temperature variations can be allowed if the purpose of avoiding damaging of the goods shall be secured. A metallic thermometer is as usual provided for operating the registering needle or pen.

For changing the recording sheet it is necessary to provide for accessibility of the recording drum. To this end the recording drum and also the metallic thermometer for controlling the indicating needle are mounted on a common carrier which can be inserted into a protecting casing. This protecting casing is provided with a window allowing inspection of the indicating needle and its position with relation to the recording drum, and this casing is adapted to be put on a bracket within the railway car near a window in an outer wall of the car, the bracket and such car window being in such correlation to each other that the window in the casing of the temperature recording device is in register with the window in the outer car wall when the temperature recording apparatus is brought into operative position on said bracket within the car, so that it is possible to observe the position of the indicating needle of the instrument through the window in the car wall and the window in the casing of the instrument.

Preferably the carrying bracket for the instrument provided in the interior of the car adjacent the car window is made in the form of a casing open at opposite ends, one open end being substantially in register with the car window and the other open end being designed for receiving the instrument.

Features of the temperature recording device itself allowing convenient handling of the instrument in the controlling system according to this invention appear on the accompanying drawings and will be explained with reference to the drawings in the following specification.

In the drawings Fig. 1 shows substantially diagrammatically a sectional view through a corner of a railway car provided with a device for temperature control in accordance with the invention.

Fig. 5 is a perspective view of a portion of a modified construction of the metallic thermometer.

Figure 1:
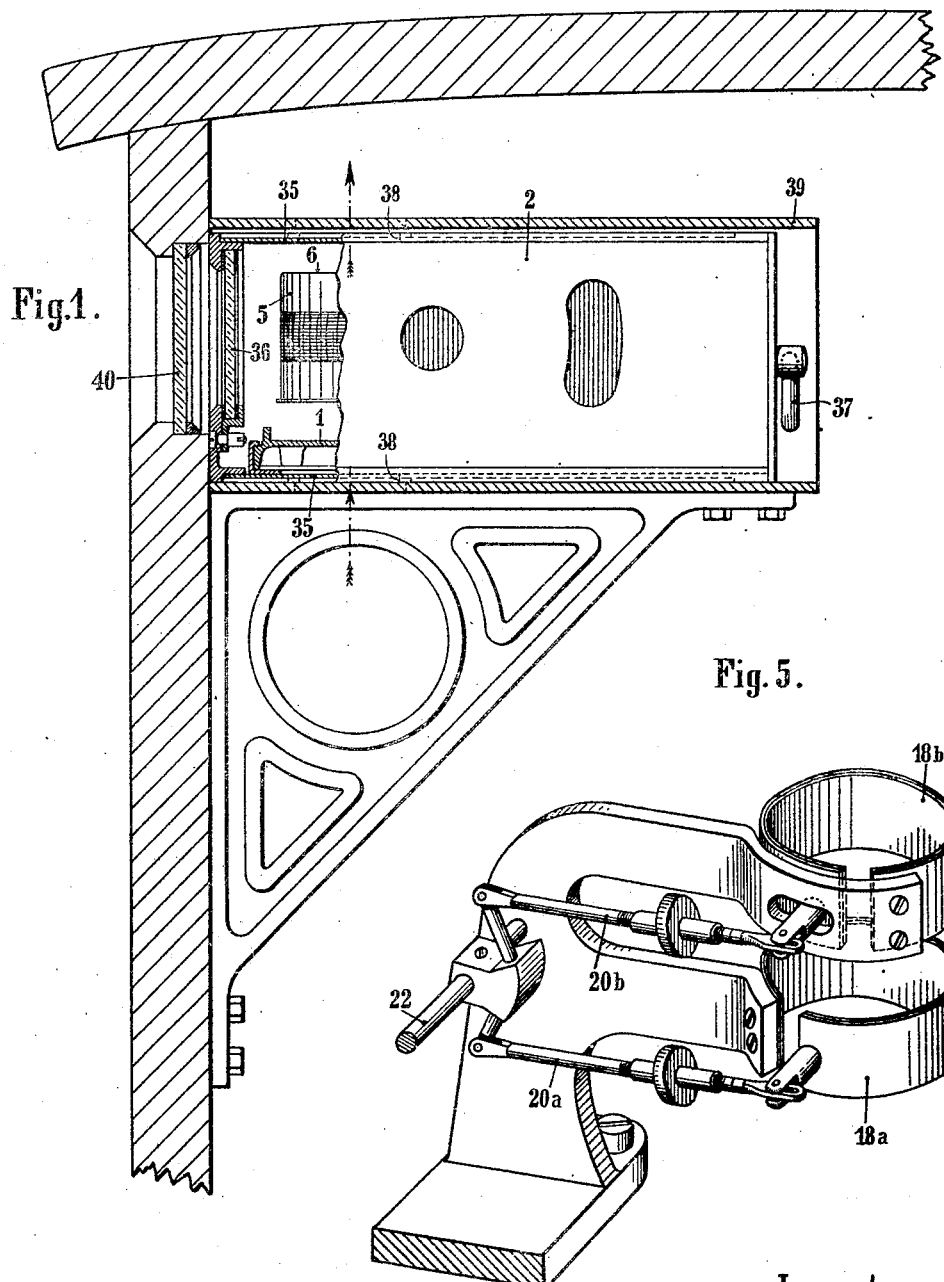

The operative elements of the temperature recording device are mounted on a common carrier which consists of a metallic plate 1 which is provided at one end with a vertical front wall 2. 3 is a casing for a coil spring of the clock work driving the recording drum. The shaft of the spring casing is designated with the numeral 4 and carries the drum 5 which is provided with a front wall 6. For guiding the drum 5 rods 7 are provided. The front wall 6 of the drum is provided with two gripping openings 8, 9 and carries swinging plates or levers 10, 11 rotatably mounted on pins 12, 13 and provided with milled edges 14, 15 adapted to contact with a milled edge 16 of a wheel 17 mounted on the clock work shaft 4. The edge 16 of the wheel 17 is chamfered, so that proper gearing of plates 10, 11 and wheel 17 is secured in spite of eventual shocks of the car.

The metallic thermometer consists as usual of a so-called bi-metallic strip 18 which by a system of interconnected rods and levers is connected with the indicating and writing needle or pen 19. For actuating the writing pen 19 in accordance with the drawing the bi-metallic strip 18 is connected with a rod 20 jointed to a short lever 21 mounted on shaft 22, said shaft carrying a springy arm 23 carrying the writing pen 19. The rod 20 is provided at its free end with a slot 24 allowing a pin 25 firmly connected to the free end of the bi-metallic strip 18 to move therein. 26 is a spring connected to the springy arm 23 tending to permanently keep the inner end of slot 24 in touch with pin 25. 27 is a cam body carried by an arm 29 rotatably mounted on a pin 28, said cam body being provided with a cam 30 which by a coil spring 31 is permanently kept in slight contact with the lower edge of the recording drum 5. When the recording drum is in working position, then the springy arm 23 is at a certain distance from the cam body 27. If however the recording drum is raised, then the cam body 27 is rotated by spring 31 and is brought in contact with the springy arm 23, so that the indicating and writing needle or pen 19 is brought out of contact with the recording drum or the registering paper mounted thereon.

The springy arm 23 moves up and down in front of the cam body 27 in dependence on the temperature. If the temperature rises above the allowed point, then the springy arm 23 comes into contact with the inclined portion 32 of the cam body with the effect that the needle is lifted from the drum. On further rising of the temperature the springy arm 23 enters the slot 33 in the cam body 27. The curved bi-metallic strip is allowed to further open the pin 25 performing at such motion of the bi-metallic strip a lost motion movement within slot 24. 34 designates a polished sheet metal device arranged in front of the metallic thermometer 18 and preventing radiation from affecting the metallic thermometer.

The carrier 1 of the operative elements of the temperature recording device is slidably inserted into a metallic casing 35. This metallic casing is provided with a window 36 allowing the observation of the position of the recording of the needle or pen 19. This window gives access of heat radiation to the interior of the casing. This is the reason why the metallic screen 34 is provided to prevent the heat radiation coming from window 36 to impinge on the bi-metallic strip 18. The casing 35 is closed on that side from which the carrier 1 is inserted therein by the upright wall 2 provided on the carrier. On the wall opposite the window 36 a handle 37 is provided for convenient transportation of the instrument. The walls of the casing 35 above and below the metallic thermometer 18 are provided with ventilation openings 38 in register with the metallic thermometer.

Figure 2:
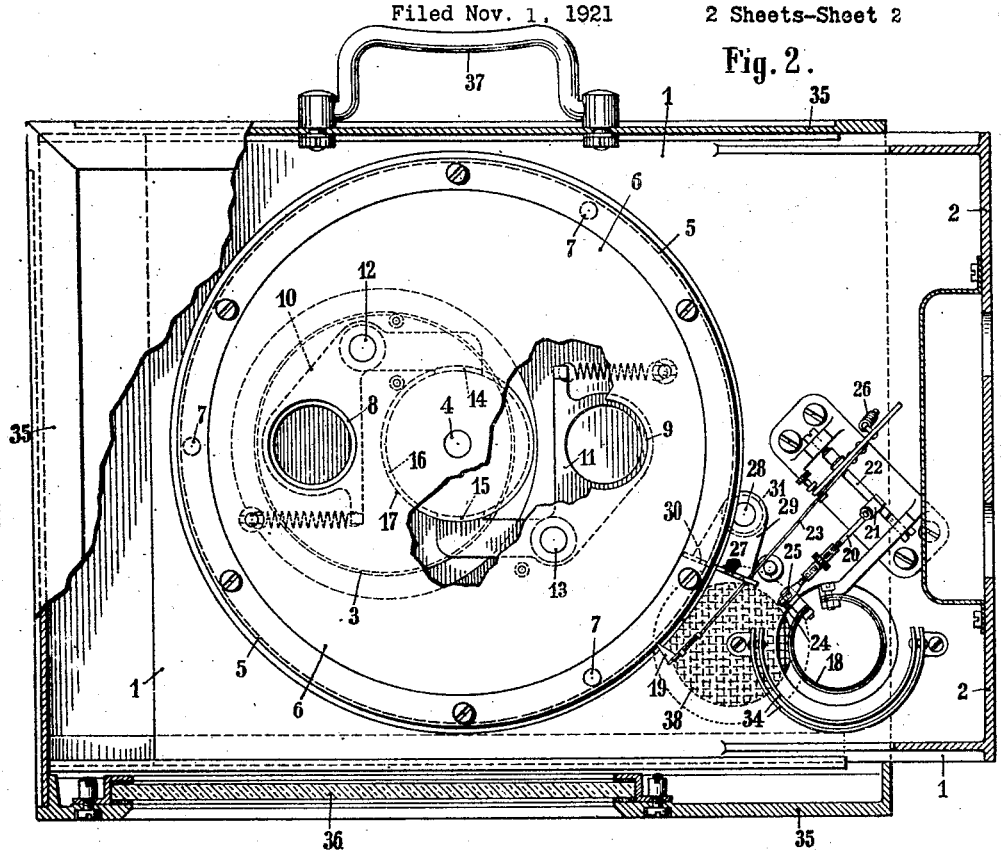
Fig. 2 is a plan of a temperature recording device employed in the temperature controlling system.
Figure 3:
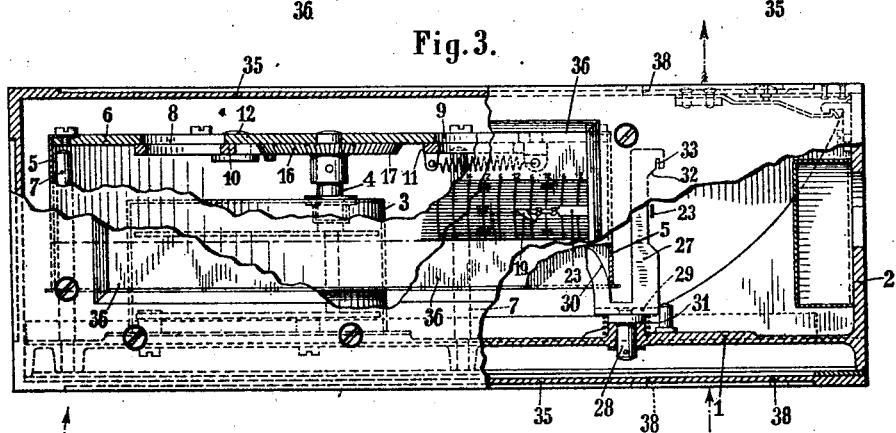
Fig. 3 is a sectional view of the device.
Figure 4:
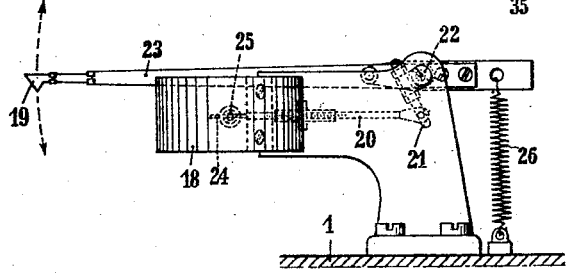
Fig. 4 is an elevation of the metallic thermometer of the device with the indicating needle actuated thereby.

The temperature recording device as shown in Figs. 2-4 is designed for being used as above mentioned in a system of controlling the temperature within a railway car. For this purpose the railway car is provided within a carrying bracket for the instrument which as illustrated on the drawing has the form of a casing open at opposite ends and having one open end adjacent and in register with the window 40 in an outer wall of the railway car. If the instrument is grasped with the handle 37, then it can easily be inserted into the casing 39 and the window 36 of the instrument casing brought into register with the window 40 in the railway car, so that the position of the indicating and writing needle 19 on the recording drum 5 can easily be observed from outside the car. When the instrument is so inserted into the car casing 39, then the carrier 1 for the operative elements of the instrument is automatically locked against being withdrawn from the instrument casing 35 on account of the fact that the carrier 1 is slidable within casing 35 in a direction parallel to the window 36, so that the casing 39 of the car prevents access to the front wall 2 at the front end of the carrier 1.

Fig. 5 shows in a merely diagrammatical manner a modification of a thermometer device which is distinguished from that in Figs. 2 to 4 in this way that instead of one bi-metallic strip 18 two strips $18^a$, $18^b$ are provided, one above the other having their free ends moving under temperature influences in opposite directions. These bi-metallic strips are connected with rods 20ª, 20ᵇ respectively which communicate the movement transmitted to them by the bi-metallic strips to the shaft 22. Under temperature influences the bi-metallic strips actuate the shaft 22 in the same sense, whereas under the influence of shocks a compensation takes place in so far as the shocks tend to displace the free ends of the two bi-metallic strips in the same direction, such displacement being transmitted to the shaft 22 in opposite directions.

In view of the previous description the use and operation of the new temperature controlling system is obvious.

Assuming the spring of the clock work enclosed in drum 3 being wound up and the instrument being brought into operative position within casing 39, then the officials in the railway station are able by looking through windows 40 and 36 to ascertain if the temperature within the railway car is within the prescribed limits. The large diameter of drum 5 allows continuous registration at sufficient feeding speed for a period of time as in question even for a long way.

If at the end of a special passage it becomes necessary to replace the recording sheet on drum 5 by a fresh sheet, then the attendant grasps the handle 37 and pulls the recording instrument out of the casing 39. This being done he can transport the instrument to the office of the station. Here the carrier 1 is pulled out of the casing 35 by grasping the front wall 2 which for this purpose is provided with suitable hand holes. This being done the attendant puts his fingers into the holes 8, 9 in the front wall 6 of the recording drum 5 and lifts the drum. When he grasps the drum with his fingers, then he turns the plates 10, 11 about their pivots 12, 13 bringing thereby automatically out of mesh the milled portions 14, 15 of the plates with the driving wheel 17. It appears that in a very simple manner the drum 5 is made ready for removing one recording sheet and bringing on a fresh sheet. Hereafter the drum is again put on; such putting on of the drum being much facilitated by the guiding rods 7. At the moment where the fingers are drawn back from the openings 8, 9 the plates 10, 11 again come into gear with the wheel 17 of the clock work under the influence of springs provided for this purpose. The carrier 1 then is again inserted into casing 35 and the instrument ready for being again inserted into a casing 39 of a railway car.

What I claim is:—

1. A temperature controlling system for railway cars comprising a temperature indicating device adapted to be read behind an observation-window in an outer wall of the car, two casings the one connected with the car open towards the observation-window in the wall of the car, said casing having inside the car an opening for inserting the said second casing, the second casing forming a container for a temperature recording device and provided with a window for the observation of the indication of the recording device and provided with a handle the recording device mounted on a base plate in firm connection with a wall portion of said second casing perpendicular to the wall portion of the casing provided with a handle and adapted to be removably inserted into the said second casing, the wall portion connected with the carrying base plate of the recording device forming a closure for the instrument casing, the insertion of said second casing into said first named casing connected with the car being effected in such a manner that its observation-window comes into line with the observation-window in the wall of the car.

2. In a temperature recording device provided with a metallic thermometer in operative connection with an indicating and recording member a detachable recording drum and a clock work for operating the drum, the drum provided with an end wall having a gripping opening and carrying on its inner surface a spring actuated lever normally held in gear with a driven member of the clock work but adapted to become thrown out of gear on gripping of the drum through said gripping opening.

3. In a temperature registering device provided with a metallic thermometer in operative connection with an indicating and recording member a detachable recording drum and a clock work operated driving shaft for said drum having a bevelled milled wheel mounted thereon, the drum provided with an end wall carrying on its inner surface a spring actuated lever having a milled bevelled edge portion normally held in contact with said bevelled wheel on said driving shaft but adapted to become thrown out of gear from outside said drum on lifting the drum from its seat.

4. In a temperature recording device provided with a metallic thermometer in operative connection with an indicating and recording member, a clock work operated detachably mounted recording drum, a movable cam member in operative connection with the drum adapted to lift said indicating and recording member from contact with said recording drum on lifting the drum from its seat.

5. In a temperature recording device provided with a metallic thermometer in operative connection with an indicating and recording member, a clock work operated recording drum, a cam member adapted to lift the indicating and recording member from contact with said recording drum and to arrest it on reaching a position corresponding to a predetermined maximum temperature, the operative connection between said metallic thermometer and said indicating and recording member providing for a lost motion movement of the actuating member of the metallic thermometer on reaching of the stop position by said indicating and recording member.

In testimony whereof I have signed this specification.

SILVESTER WÖHRLE.